US012330153B2

(12) United States Patent
Xu

(10) Patent No.: US 12,330,153 B2
(45) Date of Patent: Jun. 17, 2025

(54) MICROFLUIDIC CHIP AND DETECTION SYSTEM

(71) Applicant: BOE Technology Group Co., Ltd., Beijing (CN)

(72) Inventor: Weifeng Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 744 days.

(21) Appl. No.: 17/630,606

(22) PCT Filed: Mar. 9, 2021

(86) PCT No.: PCT/CN2021/079717
§ 371 (c)(1),
(2) Date: Jan. 27, 2022

(87) PCT Pub. No.: WO2021/218399
PCT Pub. Date: Nov. 4, 2021

(65) Prior Publication Data

US 2022/0250068 A1 Aug. 11, 2022

(30) Foreign Application Priority Data

Apr. 27, 2020 (CN) ......................... 202010342421.8

(51) Int. Cl.
*B01L 3/00* (2006.01)

(52) U.S. Cl.
CPC ..... *B01L 3/502738* (2013.01); *B01L 2200/10* (2013.01); *B01L 2300/0816* (2013.01);
(Continued)

(58) Field of Classification Search
CPC ........... B01L 3/502738; B01L 2200/10; B01L 2300/0816; B01L 2300/0867;
(Continued)

(56) References Cited

U.S. PATENT DOCUMENTS

2004/0079424 A1* 4/2004 Takeda .................. F16K 31/007 137/624.13
2010/0143193 A1* 6/2010 Delamarche ......... B01J 19/0093 422/68.1
2019/0201894 A1* 7/2019 Cucchi ............. B01L 3/502738

FOREIGN PATENT DOCUMENTS

CN 204512599 U 7/2015
CN 106540760 A 3/2017
(Continued)

OTHER PUBLICATIONS

CN202010342421.8 first office action.

*Primary Examiner* — Jennifer Wecker
*Assistant Examiner* — Britney N. Washington
(74) *Attorney, Agent, or Firm* — IPro, PLLC

(57) ABSTRACT

A microfluidic chip and a detection system. The microfluidic chip comprises fluid inlet channels (21) and a microvalve (1), and the microvalve (1) comprises a magnetic valve core (12), a valve core movement channel (11) and a magnetic control device (13); the valve core movement channel (11) is provided with at least two adapter openings (111), and at least one adapter opening (111) is connected to the fluid inlet channels (21); the magnetic valve core (12) is located in the valve core movement channel (11) and may move in the valve core movement channel (11), and the radial size of the magnetic valve core (12) is greater than that of each adapter opening (111); and the magnetic control device (13) is located outside the valve core movement channel (11), and is configured to move along the valve core movement channel (11) so as to drive the magnetic valve core (12) to move in the valve core movement channel (11).

19 Claims, 7 Drawing Sheets

(52) U.S. Cl.
CPC . *B01L 2300/0867* (2013.01); *B01L 2400/043* (2013.01); *B01L 2400/0481* (2013.01)

(58) Field of Classification Search
CPC ....... B01L 2400/043; B01L 2400/0481; B01L 2200/16; B01L 2300/1827; B01L 2400/0616; B01L 2400/0622; B01L 2400/0633; B01L 2400/0677; B01L 2400/0683; B01L 3/5027
See application file for complete search history.

(56) References Cited

FOREIGN PATENT DOCUMENTS

| | | | | | |
|---|---|---|---|---|---|
| CN | 206637105 | U | | 11/2017 | |
| CN | 108591609 | A | | 9/2018 | |
| CN | 207894807 | U | | 9/2018 | |
| CN | 108970655 | A | * | 12/2018 | ............ B01L 3/5027 |
| CN | 109296823 | A | * | 2/2019 | ........ B01L 3/502738 |
| CN | 111054456 | A | | 4/2020 | |
| CN | 210600276 | U | | 5/2020 | |
| CN | 111514948 | A | | 8/2020 | |

* cited by examiner

MICROFLUIDIC CHIP AND DETECTION SYSTEM

CROSS REFERENCE TO RELATED APPLICATIONS

The present application is a national phase entry under 35 U.S.C. § 371 of International Application No. PCT/CN2021/079717, filed on Mar. 9, 2021, which claims priority to Chinese Patent Application No. 202010342421.8, filed to the China National Intellectural Property Administration on Apr. 27, 2020, the entire contents of which are incorporated herein by reference.

FIELD

The application relates to the technical field of microfluidic chips, in particular to a microfluidic chip and a detection system.

BACKGROUND

Microfluidic systems have already been applied in many fields such as gene analysis, clinical diagnosis, drug screening and environment detection. The system can provide an integrated one-stop detection service of 'sample in-result out', which usually involves fluid control problems such as adding required fluid reagents at respective stages, circulation and flow regulation of fluid in one or more fluid channels. Thus how to control the fluid in a microfluidic system is the key of development of microfluidic chips.

SUMMARY

The application discloses a microfluidic chip and a detection system, and aims to improve a fluid control solution of the microfluidic chip and improve the fluid control efficiency and yield of the microfluidic chip.

In order to achieve the above purpose, the application provides the following technical solutions.

A microfluidic chip includes a fluid inlet channel and a microvalve, wherein the microvalve includes a magnetic valve core, a valve core movement channel and a magnetic control device; wherein:

- the valve core movement channel is provided with at least two adapter openings, and at least one of the at least two adapter openings is connected to the fluid inlet channel;
- the magnetic valve core is located in the valve core movement channel and is movable in the valve core movement channel, and the radial size of the magnetic valve core is greater than that of each adapter opening;
- the magnetic control device is located outside the valve core movement channel, and is configured to move along the valve core movement channel to drive the magnetic valve core to move in the valve core movement channel.

In some embodiments, the microvalve further includes a positioning magnetic body, and the positioning magnetic body is located at each adapter opening, and is configured to position the magnetic valve core through a magnetic force when the magnetic valve core reaches the each adapter opening.

In some embodiments, the magnetic valve core is spherical; the section of the valve core movement channel is circular, and the section size of the valve core movement channel is matched with the section size of the magnetic valve core.

In some embodiments, the valve core movement channel includes one or more branches, and the end portion of each branch is provided with one adapter opening.

In some embodiments, the radial size of the end portion of each branch is greater than that of other positions of the valve core movement channel.

In some embodiments, the side wall of the valve core movement channel is provided with an accommodation part protruding outward, and the accommodation part is configured to accommodate the magnetic valve core.

In some embodiments, the magnetic control device includes:

- a driving magnetic body, configured to drive the magnetic valve core to move in the valve core movement channel by a magnetic force; and
- a mechanical arm, connected to the driving magnetic body and configured to drive the driving magnetic body to move along the valve core movement channel.

In some embodiments, the microfluidic chip further includes a liquid supply device, and the liquid supply device includes a liquid storage mechanism and a liquid release mechanism; the liquid storage mechanism is configured to store liquid, and the liquid release mechanism is configured to be connected with the liquid storage mechanism and the fluid inlet channel and release the liquid in the liquid storage mechanism into the fluid inlet channel in response to being triggered.

In some embodiments, the liquid storage mechanism is provided with a liquid storage container and a sealing layer for sealing an outlet at the lower portion of the liquid storage container; the liquid storage container is made of a tough material which can deform under stress; the liquid release mechanism includes an accommodation cavity connected with the fluid inlet channel, an opening of the accommodation cavity faces to the sealing layer, and the edge of the sealing layer is hermetically connected with the edge of the opening of the accommodation cavity; the edge of an opening of the accommodation cavity is provided with a protruding part extending towards the center of the opening, the orthographic projection of the protruding part on the sealing layer is located within a non-hermetical-connection area of the sealing layer, and the protruding part is configured to pierce the sealing layer when an interaction between the protruding part and the sealing layer occurs.

In some embodiments, the sealing layer is made of a brittle material which can be broken under stress.

In some embodiments, the material of the sealing layer includes aluminum foil; the material of the liquid storage container includes plastic.

In some embodiments, the microfluidic chip includes a chip body; the chip body is provided with the accommodation cavity and the fluid inlet channel; and the liquid storage mechanism is fixed to the chip body.

In some embodiments, the liquid supply device further includes a connecting layer, and the connecting layer is disposed between the sealing layer of the liquid storage mechanism and the accommodation cavity of the liquid release mechanism and is configured to hermetically connect the sealing layer with the edge of the opening of the accommodation cavity.

In some embodiments, the connecting layer is provided with a hollow part; the orthographic projection of the extending end of the protruding part on the sealing layer is located in the orthographic projection of the hollow part on the sealing layer.

In some embodiments, the liquid storage mechanism includes a liquid storage container and a movable part located in the liquid storage container, the size of the movable part is greater than that of an outlet at the lower portion of the liquid storage container, and the movable part is configured to seal the outlet; the gravity of the movable part is smaller than the buoyancy force of the liquid in the liquid storage container on the movable part; the liquid release mechanism is located at the outlet of the liquid storage container and is configured to: generate an adsorption force on the movable part to enable the movable part to seal the outlet of the liquid storage container, or release the adsorption force on the movable part to enable the movable part to leave the outlet of the liquid storage container under the action of the buoyancy force.

In some embodiments, an exhaust port is arranged at the top of the liquid storage container, and the liquid storage mechanism further includes a breathable film for sealing the exhaust port at the top of the liquid storage container; or, the liquid storage container is made of a tough material which can deform under stress.

In some embodiments, the liquid release mechanism includes: a thermosensitive viscous structure, located at the outlet of the liquid storage container and configured to be bonded with the movable part, wherein when the temperature is lower than a set temperature, the sum of the adhesive force of the thermosensitive viscous structure on the movable part and the gravity of the movable part is greater than the buoyancy force on the movable part in the liquid, and when the temperature is higher than or equal to the set temperature, the sum of the adhesive force of the thermosensitive viscous structure on the movable part and the gravity of the movable part is smaller than the buoyancy force on the movable part in the liquid.

In some embodiments, the material of the thermosensitive viscous structure includes straight-chain alkanes, branched-chain alkanes or a mixture of the straight-chain alkanes and the branched-chain alkanes.

In some embodiments, the liquid release mechanism further includes an electrothermal structure, located at the outlet of the liquid storage container and configured to generate heat in response to being electrified so as to heat the thermosensitive viscous structure.

In some embodiments, the electrothermal structure includes an electrothermal material layer and an electrode layer which are sequentially stacked in the direction away from the outlet of the liquid storage container, and the electrothermal material layer is electrically connected with the electrode layer; the electrothermal structure is provided with a through hole penetrating through all layers of structures, and the through hole faces to the outlet of the liquid storage container.

In some embodiments, the material of the electrothermal material layer includes indium tin oxide, nickel-chromium alloy, iron-chromium-aluminum alloy, barium titanate ceramic, silicon carbide, lanthanum chromate, zirconium oxide and molybdenum disilicide.

In some embodiments, the electrothermal structure further includes one or more of an insulating layer, a protective layer, a substrate layer and a heat insulation layer. The insulating layer is located between the electrothermal material layer and the electrode layer, and is provided with a via hole allowing the electrothermal material layer to be electrically connected with the electrode layer. The protective layer is located on one side of the electrothermal material layer facing away from the electrode layer, and is configured to protect the electrothermal material layer. The substrate layer is located on the side of the electrode layer facing away from the electrothermal material layer and is configured to bear film layers. The heat insulation layer is located on the side of the substrate layer facing away from the electrode layer.

In some embodiments, the movable part is spherical; the thermosensitive viscous structure is located between the electrothermal structure and the outlet of the liquid storage container and is tangent to the surface of the movable part.

A detection system includes any one of the microfluidic chips described above.

DETAILED DESCRIPTION

The technical solution in the embodiments of the application is clearly and completely described in combination with the accompanying drawings in the embodiments of the application, and obviously, the described embodiments are only part of the embodiments of the application, not all the embodiments. Based on the embodiments in the application, all other embodiments obtained by those skilled in the art without paying creative efforts fall into the scope of protection of the application.

Figure 1:
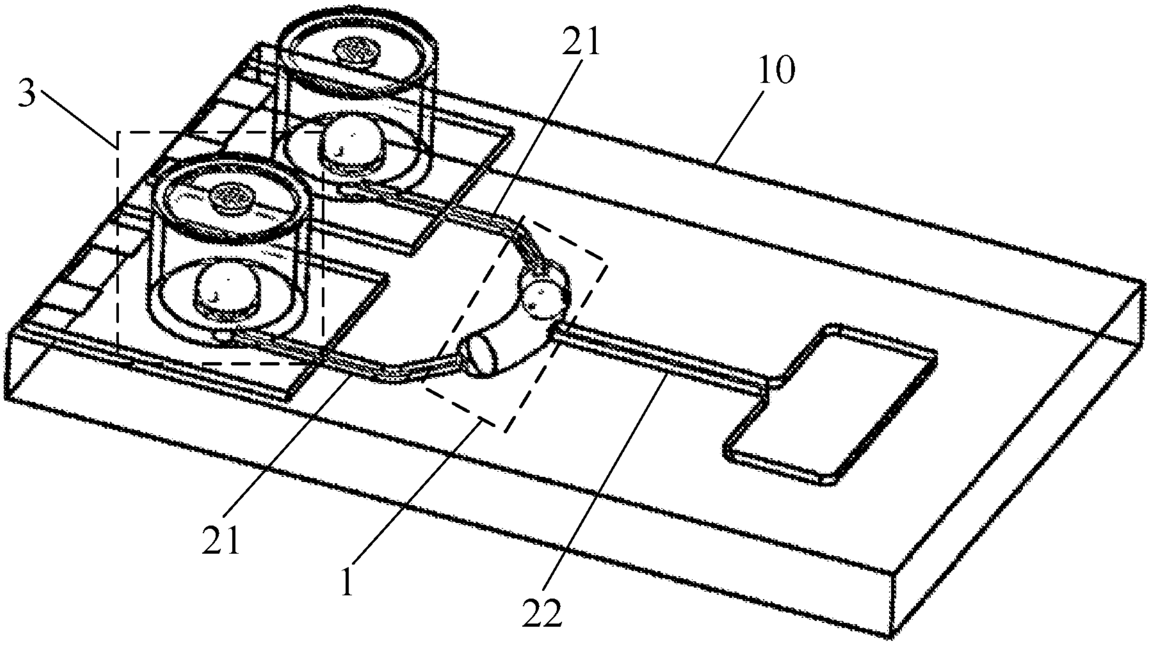
FIG. 1 is a partial structural schematic diagram of a microfluidic chip according to an embodiment of the application.
Figure 2:
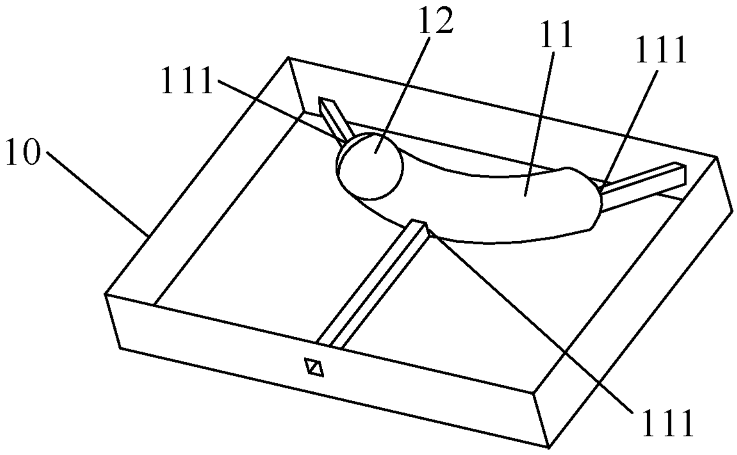
FIG. 2 is a structural schematic diagram of a microvalve of a microfluidic chip according to an embodiment of the application.

As shown in FIG. 1 and FIG. 2, a microfluidic chip according to an embodiment of the application includes fluid inlet channels 21 and a microvalve 1, and the microvalve 1 includes a magnetic valve core 12, a valve core movement channel 11 and a magnetic control device 13.

The valve core movement channel 11 is provided with at least two adapter openings 111, and at least one adapter opening 111 is connected with the fluid inlet channels 21.

The magnetic valve core 12 is located in the valve core movement channel 11 and can move in the valve core movement channel 11, and the radial size of the magnetic valve core 12 is greater than that of each adapter opening 111.

The magnetic control device 13 is located outside the valve core movement channel 11 and is configured to move along the valve core movement channel 11 so as to drive the magnetic valve core 12 to move in the valve core movement channel 11.

The microfluidic chip according to the embodiment of the application is provided with the fluid inlet channels 21 and the microvalve 1 used for controlling the path switching of fluid in the chip. The microvalve 1 is provided with the valve core movement channel 11, at least one adapter opening 111 of the valve core movement channel 11 is connected with the fluid inlet channels 21. The fluid reagents to be added into the microfluidic chip at various stages can enter the valve core movement channel 11 through the adapter opening 111 connected with the fluid inlet channels 21, then enters a downstream channel 22 through other adapter openings 111, and finally reaches a reaction detection area of the microfluidic chip.

In some embodiments, a plurality of adapter openings 111 of the valve core movement channel 11 may be connected with a plurality of channels respectively, the plurality of channels include fluid inlet channels 21 and a downstream channel 22. A fluid movement path is: the fluid sequentially passes through the fluid inlet channels 21, the valve core movement channel 11 and the downstream channel 22. For example, a valve core movement channel 11 shown in FIG. 1 is provided with three adapter openings 111, and the three adapter openings 111 are connected with two fluid inlet channels 21 and one downstream channel 22 respectively. Through the microvalve 1, the circulation and flow switching of fluid in one or more channels can be controlled.

In some embodiments, the control process of the microvalve 1 is as follows: the magnetic valve core 12 is driven by the magnetic control device 13 to move in the valve core movement channel 11, since the radial size of the magnetic valve core 12 is greater than that of each adapter opening 111, when the magnetic valve core 12 moves to a certain adapter opening 111, the adapter opening 111 can be blocked to be closed, and thus fluid in the valve core movement channel 11 cannot enter a downstream channel 22 connected with the adapter opening 111 through the adapter opening 111; or, fluid in the fluid inlet channels 21 cannot enter the valve core movement channel 11 through the adapter opening 111. Correspondingly, the magnetic valve core 12 can be driven by the magnetic control device 13 to leave the adapter opening 111, so that the adapter opening 111 is opened, and then the fluid can enter into and exit from the valve core movement channel 11 through the adapter opening 111. As such, circulation and flow switching of fluid in the microfluidic chip in the channels can be controlled, and the fluid control efficiency and yield of the microfluidic chip are improved.

In some embodiments, as shown in FIG. 1 and FIG. 2, the microfluidic chip according to the embodiment of the application is provided with a chip body 10, and the fluid inlet channels 21 and the microvalve 1 are arranged in the chip body 10.

In some embodiments, as shown in FIG. 1 and FIG. 2, the magnetic control device is located outside the valve core movement channel 11, for example may be located outside the chip body 10, and does not need to be integrated with the chip body 10. As such, the driving structure of the microvalve is simple to allow a high driving yield, and the movement of fluid in the chip body 10 will be affected. Therefore, the sealing effect of the chip body 10 can be improved, and the miniaturization design of the chip body 10 is facilitated.

In some embodiments, as shown in FIG. 2, the microvalve 1 further includes a positioning magnetic body (not shown in the figure) located at the adapter opening 111 and configured to position the magnetic valve core 12 through a magnetic force when the magnetic valve core 12 moves to the position of the adapter opening 111.

Exemplarily, the positioning magnetic body may be a permanent magnet.

Exemplarily, the chip body is generally flaky, and the positioning magnetic body may be arranged independently from the chip body and detachably installed on the surface of the chip body. When the magnetic control device drives the magnetic valve core to move, the positioning magnetic body is not connected with the chip body, so that the influence on the movement of the magnetic valve core is avoided. After the magnetic valve core reaches the adapter opening that needs to be closed and blocks the opening, the positioning magnetic body may be installed on the position, close to the adapter opening, on the surface of the chip body, so that the magnetic valve core is positioned at the adapter opening. Further, when the positions of other parts in the chip body need to be changed complexly, such as centrifugation, rotation, oscillation and reverse rotation, the position of the magnetic valve core can be kept unchanged by the positioning magnetic body, to ensure the opening and closing control of the adapter opening of the fluid channel.

Alternatively, exemplarily, the positioning magnetic body may also be arranged in the chip body, for example, the positioning magnetic body is directly fixed to the edge of the adapter opening of the valve core movement channel. At the moment, the magnetism of the positioning magnetic body is relatively small, and the acting force of the positioning magnetic body on the magnetic valve core is far smaller than the driving force of the magnetic control device on the magnetic valve core.

In some embodiments, as shown in FIG. 1 and FIG. 2, the radial size of the magnetic valve core 12 is greater than the radial size of each adapter opening 111; or, the maximum size of the adapter opening 111 is smaller than the diameter of the magnetic valve core 12.

Exemplarily, the radial size of the adapter opening 111 is less than ½ of the diameter of the magnetic valve core 12.

Exemplarily, the center cross section of the adapter opening 111 may be located on the same plane as the center cross section of the valve core movement channel 11 and may also be lower than the center cross section of the valve core movement channel 11. For example, the adapter opening 111 may be located at ½ of the height of the valve core movement channel 11 and may also be lower than ½ of the height of the valve core movement channel 11. Therefore, the fluid flows out through the adapter opening 111 and enters other channels. In some embodiments, a sealing ring may be additionally arranged on the outer edge of the adapter opening 111 so as to improve the sealing control effect of the microvalve 1.

In some embodiments, the material of the magnetic valve core may be a permanent magnet, such as a neodymium-iron-boron magnet, a samarium-cobalt magnet, and an aluminum-nickel-cobalt magnet, and may also be iron, cobalt, nickel and other substances with ferromagnetism. The magnetic valve core may be hollow or solid.

Further, in order to improve the sealing effect of the microvalve or in order to prevent a reagent from reacting with the magnetic valve core material, the surface of the magnetic valve core may be wrapped with a layer of elastic material or sealing material. The elastic material may be corrosion-resistant and elastic high polymers such as polydimethylsiloxane (PDMS), and polytetrafluoroethylene (PTFE), and may also be inert metal with stable chemical properties; the sealing material may be vaseline, paraffin and other substances. The wrapping layer should be as thin as possible, the thickness of the wrapping layer should be smaller than ¼ of the diameter of the magnetic valve core, and in some embodiments, the thickness of the wrapping layer should be smaller than ⅛ of the diameter of the magnetic valve core.

In some embodiments, as shown in FIG. 1 and FIG. 2, the magnetic valve core 12 is spherical; the section of the valve core movement channel 11 is circular, and the section size of the valve core movement channel 11 is matched with the section size of the magnetic valve core 12.

Exemplarily, the material of the valve core movement channel may be non-metallic materials including but not limited to PC, PS, PMMA, COC, COP, PDMS and the like. In some embodiments, the valve core movement channel is made of a material which does not react with the circulating liquid reagent and without interaction with the magnetic valve core.

Further, the position and shape of the valve core movement channel can be determined according to the position and number of the fluid channels needing to be switched. In some embodiments, on a magnetic valve core movement path in the valve core movement channel, the longitudinal section at each position is circular, the circular diameter of the longitudinal section is approximately the same as the diameter of the magnetic valve core, and the diameter of the circular longitudinal section of the valve core movement channel may be slightly greater than the diameter of the magnetic valve core, for example, the diameter is 5/4 of the diameter of the magnetic valve core, the diameter is 9/8 of the diameter of the magnetic valve core, or 17/16 of the diameter of the magnetic valve core.

In some embodiments, the valve core movement channel includes one or more branches, and the end portion of each branch is provided with one adapter opening.

Exemplarily, the radial size of the end portion of each branch may be greater than the radial size of other positions, namely, the radial size of the portion, close to the adapter opening (magnetic valve core stop position), of the valve core movement channel is greater than the radial size of other positions of the valve core movement channel.

In some embodiments, the longitudinal section at the magnetic valve core stop position is circular, and the diameter of the circular longitudinal section at the magnetic valve core stop position may be slightly greater than the diameter of the magnetic valve core. For example, diameter of the circular longitudinal section at the magnetic valve core stop position is 5/4 of the diameter of the magnetic valve core, 9/8 of the diameter of the magnetic valve core, or 17/16 of the diameter of the magnetic valve core. Further, the diameter of the longitudinal section at the magnetic valve core stop position can be changed and is slightly greater than the diameters of the longitudinal sections at the other positions of the valve core movement channel.

For example, the diameter of the longitudinal section at the magnetic valve core stop position is 17/16-5/4 of the diameters of the longitudinal sections at the other positions of the valve core movement channel, and therefore when the magnetic valve core is static at the magnetic valve core stop position, the magnetic valve core is fixed and cannot move due to the fact that the position where the magnetic valve core is located has different depths.

Figure 3A:
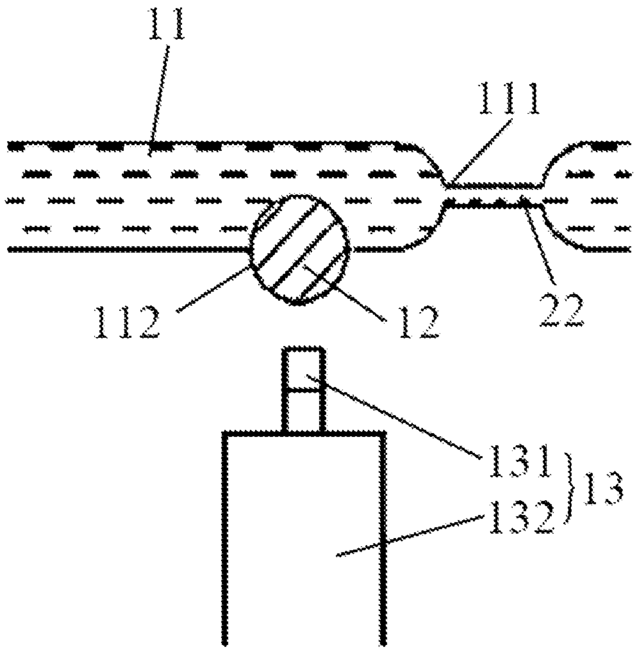
FIG. 3A is a structural schematic diagram of a microvalve according to an embodiment of the application in one state.
Figure 3B:
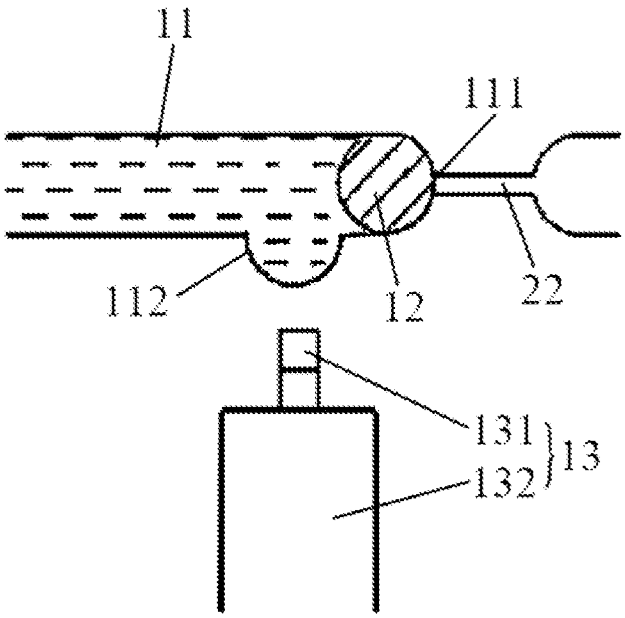
FIG. 3B is a structural schematic diagram of the microvalve in FIG. 3A in another state.

In some embodiments, as shown in FIG. 3A and FIG. 3B, the side wall of the valve core movement channel 11 is provided with an accommodation part 112 protruding outwards, and the accommodation part 112 is configured to accommodate the magnetic valve core 12.

Exemplarily, the accommodation part 112 is sized to at least accommodate part of the magnetic valve core 12 or accommodate the whole magnetic valve core 12. In some embodiments, the accommodation part 112 may be in a hemisphere shape matched with the shape of the magnetic valve core 12 and may also be in other shapes, which is not limited herein.

In some embodiments, when the magnetic valve core 12 is located in the valve core movement channel 11, the magnetic valve core has a blocking effect on fluid. As the accommodation part 112 is arranged on the side wall of the valve core movement channel 11, when the magnetic valve core 12 does not need to be arranged at the adapter opening 111 at the end portion of the branch, namely, the magnetic valve core 12 is not used for closing the adapter opening 111, as shown in FIG. 3A, the magnetic valve core 12 can be disposed in the accommodation part 112, so as to give way to the fluid in the valve core movement channel 11. Therefore, the fluid can pass through the branch where the side wall is located more easily.

For example, exemplarily, as shown in FIG. 3A and FIG. 3B, the valve core movement channel 11 includes one branch, the end portion of the branch is provided with one adapter opening 111, and the adapter opening 111 is connected with the downstream channel 22. As shown in FIG. 3B, when the magnetic valve core is driven by the magnetic control device 13 to reach the adapter opening 111 at the end portion of the branch, the adapter opening 111 is closed, and fluid cannot enter the downstream channel 22 through the valve core movement channel 11. As shown in FIG. 3A, when the magnetic valve core 12 is driven by the magnetic control device 13 to leave the adapter opening 111 and enter the accommodation part 112, the adapter opening 111 is opened, and fluid can smoothly enter the downstream channel 22 through the valve core movement channel 11.

Figure 4A:
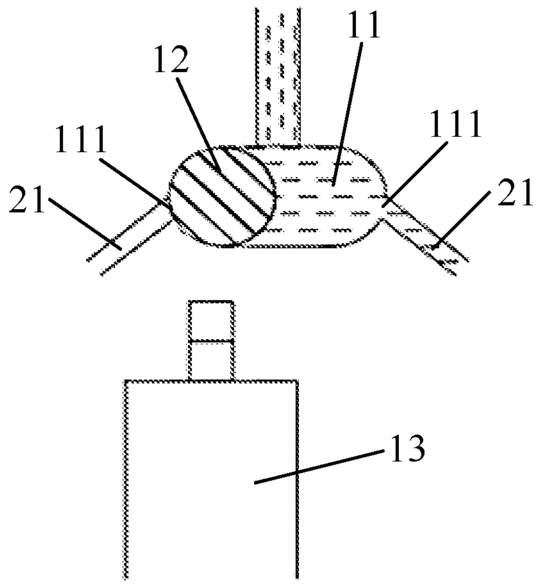
FIG. 4A is a structural schematic diagram of a microvalve according to another embodiment of the application in one state.
Figure 4B:
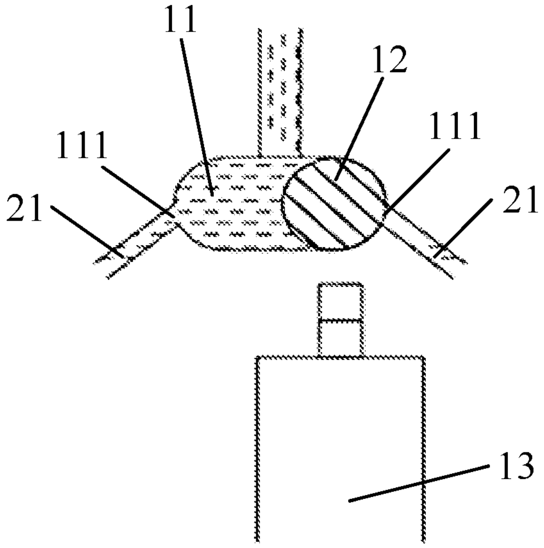
FIG. 4B is a structural schematic diagram of the microvalve in FIG. 4A in another state.

Or, exemplarily, as shown in FIG. 4A and FIG. 4B, the valve core movement channel 11 includes two branches, the end portion of each branch is provided with one adapter opening 111, and each adapter opening 111 is connected with one fluid inlet channel 21. As shown in FIG. 4A, when the magnetic valve core 12 is driven by the magnetic control device 13 to reach the adapter opening 111 at the end portion of the first branch, the adapter opening 111 is closed, and fluid in the fluid inlet channel 21 connected with the adapter opening 111 cannot enter the valve core movement channel 11 through the adapter opening 111. As shown in FIG. 4B, when the magnetic valve core 12 is driven by the magnetic control device 13 to reach the adapter opening 111 at the end portion of the second branch, the adapter opening 111 at the end portion of the first branch is opened, fluid in the fluid inlet channel 21 connected with the first branch enters the valve core movement channel 11, and instead, fluid in the fluid inlet channel 21 connected with the second branch cannot enter the valve core movement channel 11. Certainly, when the side wall of the valve core movement channel 11 is provided with an accommodation part 112, the magnetic valve core 12 can move into the accommodation part 112, at the moment, the two adapter openings 111 are both in an open state, and fluid in the two fluid inlet channels 21 can enter the valve core movement channel 11 at the same time through the two branches.

Exemplarily, a plurality of magnetic valve cores 12 may be arranged in the valve core movement channel 11, and correspondingly, a plurality of accommodation parts 112 may also be arranged on the side wall of the valve core movement channel 11.

In some embodiments, as shown in FIG. 3A and FIG. 3B, the magnetic control device 13 may include a driving magnetic body 131 and a mechanical arm 132. The driving magnetic body 131 is configured to drive the magnetic valve core 12 to move in the valve core movement channel 11 through a magnetic force. The mechanical arm 132 is connected with the driving magnetic body 131 and is configured to drive the driving magnetic body 131 to move along the valve core movement channel 11.

For example, the driving magnetic body may be a permanent magnet, the permanent magnet may a neodymium-iron-boron magnet, a samarium-cobalt magnet, an aluminum-nickel-cobalt magnet and the like, and the driving magnetic body may also be an electromagnet capable of generating magnetism after being electrified. The mechanical arm may be driven by a motor, and may also move relative to the chip body by manual control. The relative displacement includes horizontal displacement above or below the plane where the valve core movement channel is located so as to drive the magnetic valve core; certainly, the relative displacement may also include displacement in the vertical direction, so that the magnetic body is driven to be away from the chip body, and no driving force is applied to the magnetic valve core. In some embodiments, when the driving magnetic body applies an acting force on the magnetic valve core, the force is greater than other forces acting on the magnetic valve core, and the position of the magnetic valve core can be changed. When the force applied to the magnetic valve core by the driving magnetic body disappears or is smaller than the force capable of enabling the magnetic valve core to displace, the position of the magnetic valve core does not change any more.

Exemplarily, the shape of the driving magnetic body may be a sphere, a cuboid or other shapes convenient to install and control, and the size of the driving magnetic body may be smaller than or equal to the diameter of the magnetic valve core. In some embodiments, a plurality of magnetic valve cores are arranged in the valve core movement channel, the distance between the adapter openings in the valve core movement channel is relatively large, and the size of the driving magnetic body may be greater than the diameter of the magnetic valve cores under the condition that the driving magnetic body does not interfere with the magnetic valve cores at different adapter openings.

As shown in FIG. 1, FIG. 5 to FIG. 9, in some embodiments, the microfluidic chip according to the embodiment of the application further includes a liquid supply device 3, and the liquid supply device 3 includes a liquid storage mechanism 31 and a liquid release mechanism 32. The liquid storage mechanism 31 is configured to store liquid, the liquid release mechanism 32 is configured to be connected with the liquid storage mechanism 31 and the fluid inlet channel 21, and release the liquid in the liquid storage mechanism 31 into the fluid inlet channel 21 in response to being triggered.

In a specific implementation mode, as shown in FIG. 5, FIG. 6, FIG. 7A, FIG. 7B and FIG. 8, the liquid storage mechanism 31 is provided with a liquid storage container 311 and a sealing layer 312 used for sealing an outlet at the lower portion of the liquid storage container 311. The liquid storage container 311 is made of a tough material which can deform under stress.

The liquid release mechanism 32 includes an accommodation cavity 321 connected with the fluid inlet channel 21. An opening of the accommodation cavity 321 faces to the sealing layer 312, and the edge of the sealing layer 312 is hermetically connected with the edge of the opening of the accommodation cavity 321. A protruding part 322 extending towards the center of the opening is arranged at the edge of the opening of the accommodation cavity 321, the orthographic projection of the protruding part 322 on the sealing layer 312 is located within a non-hermetical-connection area of the sealing layer 312, and the protruding part 322 is configured to pierce the sealing layer 312 when interaction occurs between the protruding part and the sealing layer 312.

In some embodiments, fluid resistance is relatively large in a downstream area where liquid is about to flow through, especially when the downstream area is a sealed environment. Gas originally existing in a downstream cavity is squeezed by the entering liquid and is prone to reversely entering the liquid storage mechanism through gas-liquid exchange. Due to the fact that an accommodation cavity is arranged between the downstream cavity or a pipeline and the liquid storage mechanism whose sealing layer can be broken to release liquid, the increased containing space can avoid slow flowing or backflow of liquid caused by increase of air pressure. Moreover, due to the deformability and toughness of the material of the liquid accommodation cavity, the increased air pressure can be counteracted to a certain extent, so that the air pressure in the whole system cannot be increased. Even if the product is heated, the increase of the air pressure in the sealing pipeline can be well relieved, so that the use stability of the whole disc or chip system is improved.

Exemplarily, the material of the liquid storage container includes plastic, which may be PVC, PP, PE, PET plastic films coated with aluminum foil, and the PVC, PP, PE, PET plastic films have a thickness within 50-150 μm, and are formed into required shapes such as a hemisphere shape, and a semi-ellipsoid shape and sizes through a corresponding forming technology.

Exemplarily, the sealing layer is made of a brittle material which can be damaged under stress. For example, the brittle material is usually aluminum foil with a thickness of 10-100 μm. The shape of the sealing layer may be roughly the same as the shape of projection on horizontal plane of the liquid storage container, and the sealing layer is packaged on the edge of the opening of the accommodation cavity.

Exemplarily, as shown in FIG. 5, FIG. 7A, FIG. 7B and FIG. 8, the liquid supply device 3 further includes a connecting layer 33, and the connecting layer 33 is located between the sealing layer 312 of the liquid storage mechanism 31 and the accommodation cavity 321 of the liquid release mechanism 32 and is configured to hermetically connect the sealing layer 312 with the edge of the opening of the accommodation cavity 321. Certainly, sealing of the sealing layer 312 and the edge of the accommodation cavity 321 may also be achieved in other manners such as welding and clamping, as long as the sealing effect can be met.

For example, the material of the connecting layer may be a double faced adhesive tape, an ultraviolet curing adhesive, an epoxy adhesive and the like. The thickness of the connecting layer is 20-1000 μm. In some embodiments, the thickness of the connecting layer may be set as 100-500 μm. The boundary dimension of the connecting layer is approximately consistent with the boundary dimension of the sealing layer, one side of the connecting layer is fixedly bonded with the edge of the accommodation cavity, and the other side of the connecting layer is fixedly bonded with the sealing layer. In addition to connecting all the layers, the connecting layer can also serves as a buffer and protect the sealing layer.

Exemplarily, as shown in FIG. 5, FIG. 7A, FIG. 7B and FIG. 8, the microfluidic chip includes a chip body 10, and the chip body 10 is provided with the accommodation cavity 321 and the fluid inlet channel 21; and the liquid storage mechanism 31 is fixed to the chip body 10. In other words, the liquid release mechanism 32 is manufactured on a disc or a cartridge (a chip body 10) of the microfluidic chip, and the liquid storage mechanism 31 is fixed on the upper surface of the disc or the cartridge.

In some embodiments, the accommodation cavity 321 may be a pit or hole formed in the upper surface of the chip body 10 and is connected with the downstream fluid inlet channel 21. The outer edge of the pit or hole may be completely covered by the liquid storage mechanism 31 to ensure that the pit or hole is isolated from the external environment to achieve sealing. The volume of the pit or hole may be greater than, smaller than or equal to the volume of liquid contained in the liquid storage mechanism 31, and the pit or hole is used for containing the whole or part of the liquid released from the liquid storage mechanism 31. The protruding part 322 is of a structure extending towards the interior of the cavity on the wall of the accommodation cavity 321, the extending end (liquid release position) of the protruding part 322 is located in an area of projection on horizontal plane of a non-hot-pressing-sealing area on the sealing layer 312, and is shaped and sized to be any form convenient for placing or integral manufacture, as long as it is ensured that only the sealing layer 312 is broken by the reaction force at the liquid release position on the sealing layer 312 and liquid leakage and breakage do not occur in other positions when the pressure is downwards transferred to the sealing layer 312 through the liquid storage container 311 to enable the sealing layer 312 to expand downwards to be in contact with the liquid release position.

Figure 7A:
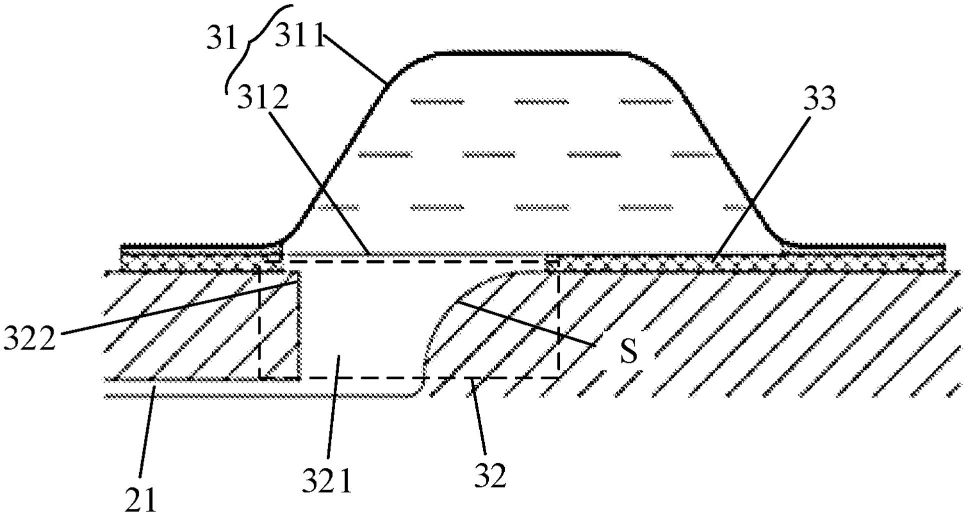
FIG. 7A is a sectional view of a liquid supply device according to an embodiment of the application in a liquid non-release state.
Figure 7B:
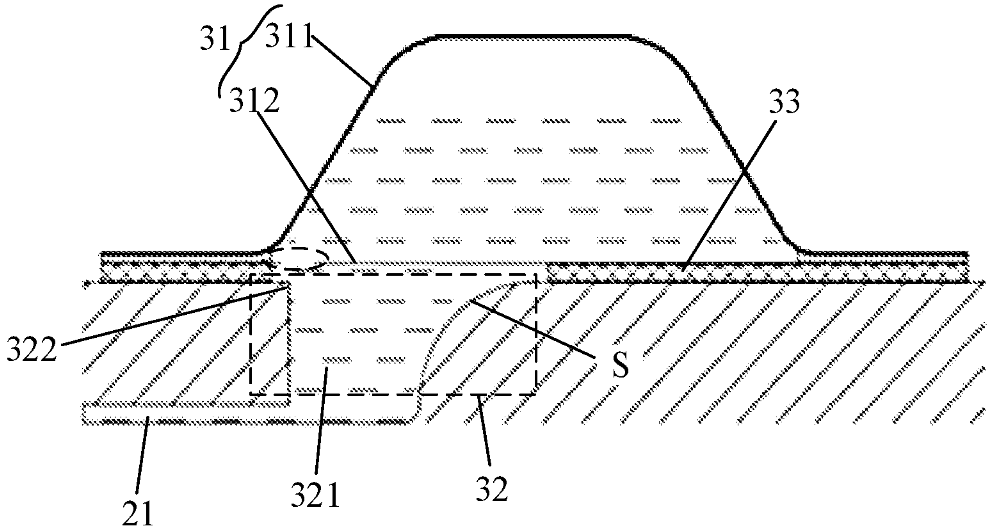
FIG. 7B is a sectional structural schematic diagram of the liquid supply device in FIG. 7A in a liquid release state.

For example, FIG. 7A shows the liquid storage mechanism 31 and the liquid release mechanism 32 in a non-release state; when liquid in the liquid storage container 311 needs to be released, certain pressure is applied to the liquid storage container 311, the pressure causes air pressure in the liquid storage container 311 to change, then the sealing layer 312 expands towards the accommodation cavity 321 to enable interaction between the sealing layer 312 and the protruding part 322 on the edge of the accommodation cavity 321, and then the sealing layer 312 is broken under stress at the extending end (liquid release position) of the protruding part 322, so that liquid release is achieved. FIG. 7B shows the liquid storage mechanism 31 and the liquid release mechanism 32 in a release state, the area indicated by the oval dotted line is an opening where the sealing layer 312 is broken under stress, and the liquid flows into the accommodation cavity 321 from this opening.

Figure 5:
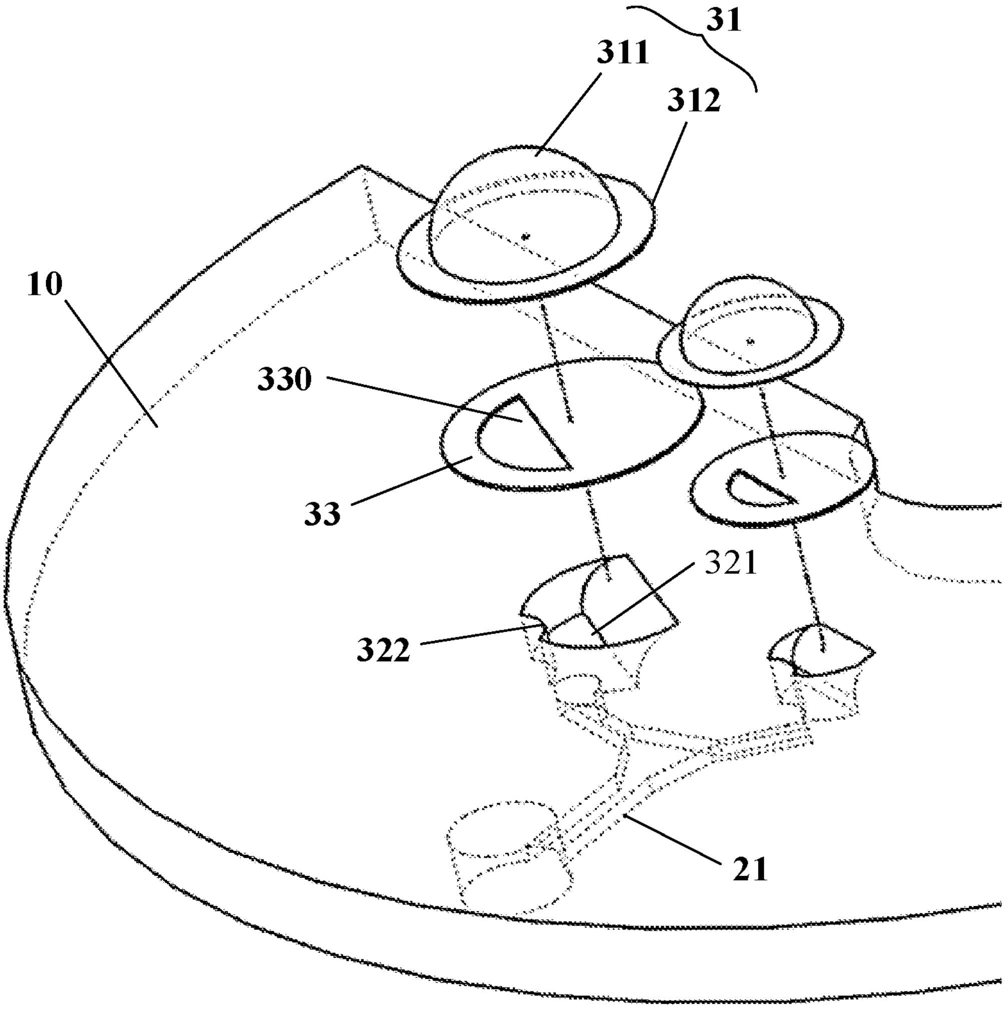
FIG. 5 is a partial structural schematic diagram of a microfluidic chip according to another embodiment of the application.
Figure 6:
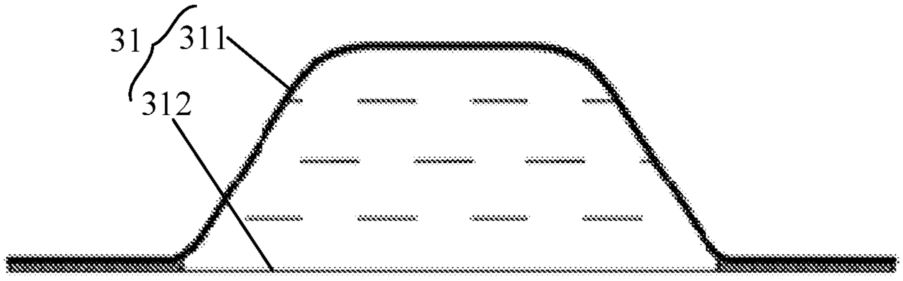
FIG. 6 is a sectional view of a liquid storage mechanism of a liquid supply device according to an embodiment of the application.

In some embodiments, pressure applied to the liquid storage container 311 can be removed after the sealing layer 312 is in contact with the liquid release position and then broken. The pressure can come from manual pressurization or mechanical device pressure, and the pressure is not enough to enable the liquid storage container 311 to generate irreversible deformation, that is, after the external force disappears, the volume of the liquid storage container 311 almost does not change. The released liquid flows out from the broken point of contact between the sealing layer 312 and the protruding part 322 based on the gravity of the liquid and enters the liquid accommodation cavity 321. As shown in FIG. 5, liquid flow may also cooperate with a common driving force of in-vitro diagnostic products, such as centrifugation, chromatography, and hydrophilic and hydrophobic modification, to drive liquid to reach a downstream sealed or open cavity through the fluid inlet channel 21. For example, the position of the fluid inlet channel 21 connected with the accommodation cavity 321 may be determined by considering the centrifugal force, such as being far away from a central shaft for centrifugal operation, and may be positioned at the radial outermost end of the chip body 10, so that the fluid can smoothly enter a downstream channel under the action of the centrifugal force.

Exemplarily, as shown in FIG. 5, FIG. 7A, FIG. 7B and FIG. 8, the connecting layer 33 is provided with a hollow part (missing area) 330, and the hollow part 330 may be circular, semicircular and elliptical. The orthographic projection of the extending end of the protruding part 322 on the sealing layer 312 is located in the orthographic projection of the hollow part 330 on the sealing layer 312. In other words, the connecting layer 33 opens at the liquid release position area while overlaps with the sealing layer 312 in other areas, so that on one hand, the sealing layer 312 in the liquid release position area is exposed, and is prone to being broken under stress, on the other hand, the sealing layer 312 in non-liquid-release-position areas can be protected, and is prevented from being prone to being broken, therefore, the accuracy of fixed-point release is improved.

Figure 8:
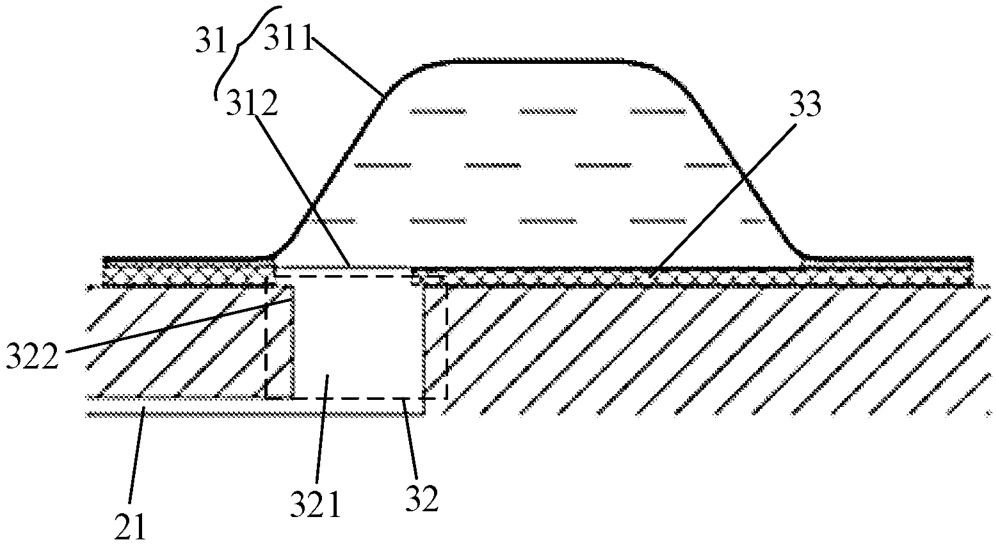
FIG. 8 is a sectional structural schematic diagram of a liquid supply device according to another embodiment of the application.

Exemplarily, in order to preventing breakage of the sealing layer 312 caused by the non-liquid-release-position areas of the accommodation cavity 321, as an optional solution, the edges of the accommodation cavity 321 in these areas are designed to be of a fillet structure, the overall height of the edges is the same as the height of a cartridge (a chip body 10), which can be obtained through conventional injection molding or machining during processing and forming without increasing the processing complexity. Further, as shown in FIG. 7A and FIG. 7B, an inclined cambered surface S may be arranged on the side wall of the accommodation cavity 321 in the non-liquid-release-position areas, so that the sealing layer 312 is not prone to being broken under stress at the position. Or as shown in FIG. 8, the connecting layer 33 completely covers the edges, except for the protruding part 322, of the accommodation cavity 321, so that elastic buffering of the non-liquid-release-position areas is increased, and the sealing layer 312 is prevented from being broken under stress at the position.

Exemplarily, as shown in FIG. 5, a plurality of the liquid storage devices may be integrated on the chip body 10 of the microfluidic chip provided by the application.

According to the liquid storage device, the liquid storage mechanism and the liquid release mechanism are good in sealing effect and small in volatilization amount, space is saved, and machining and assembling procedures are simple. Moreover, the liquid release mode is ingenious, the requirements on the matching mode and the matching device are low, and the stored liquid can be accurately and completely released to the downstream area at a specific position through simple operation. Especially for the application of sequentially releasing various liquids, the stability and reliability of the application can be improved. In addition, deformation of the liquid storage container is extremely small in the liquid release process, and air pressure balance in a closed system cannot be affected. According to the in-vitro diagnosis microfluidic chip integrated with the device, all required reagents do not need to be manually added at various stages of the detection process, and the integrated one-stop detection of 'sample in-result out' for physiological and pathological indexes is expected to be realized.

Figure 9:
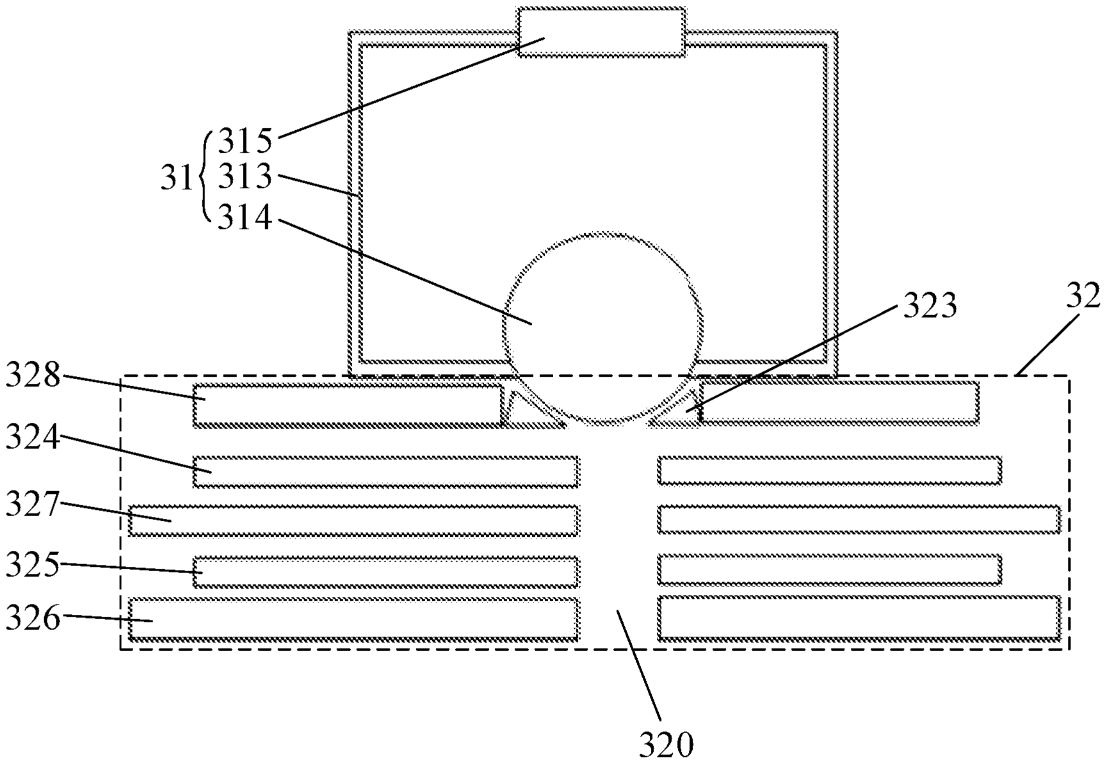
FIG. 9 is a sectional structural schematic diagram of a liquid supply device according to another embodiment of the application.

In a specific implementation mode, as shown in FIG. 9, the liquid storage mechanism 31 includes a liquid storage container 313 and a movable part 314 located in the liquid storage container 313, the size of the movable part 314 is greater than that of an outlet at the lower portion of the liquid storage container 313, and the movable part 314 is configured to seal the outlet. The gravity of the movable part 314 is smaller than the buoyancy force of the liquid in the liquid storage container 313 on the movable part 314. In some embodiments, the liquid release mechanism 32 is located at the outlet of the liquid storage container 313 and is configured to absorb the movable part 314 to enable the movable part 314 to close the outlet of the liquid storage container 313, or release the adsorption force on the movable part 314 to enable the movable part 314 to leave the outlet of the liquid storage container 313 under the action of the buoyancy force.

Exemplarily, the shape and height of the liquid storage container 313 may be any that facilitates the movable part 314 to conveniently float up and down, and the volume of the liquid storage container 313 needs to be greater than or equal to the volume of at least one type of liquid reagent required for completing in-vitro diagnosis. In some embodiments, the cross section of the liquid storage container 313 is circular.

Exemplarily, as shown in FIG. 9, an exhaust port is arranged at the top of the liquid storage container 313, and the liquid storage mechanism 31 further includes a breathable film 315 used for sealing the exhaust port at the top of the liquid storage container 313; or, the liquid storage container 313 is made of a tough material which can deform under stress. As such, the problem that liquid cannot be discharged or is sucked back after being discharged due to the fact that negative pressure is generated in the liquid storage container 313 can be solved, and the liquid can easily flow out of the liquid storage container 313 and be completely released.

For example, the breathable film may be a microporous thin film of hydrophobic property. The material of the breathable film is a PTFE or PVDF porous film. The breathable film has relatively high air permeability amount and relatively low water permeability amount. The air permeability amount may be 100 $mL/cm^2\cdot min\cdot 7$ kpa to 3000 $mL/cm^2\cdot min\cdot 7$ kpa, and in some embodiments, the air permeability amount is 300 $mL/cm^2\cdot min\cdot 7$ kpa to 1000 $mL/cm^2\cdot min\cdot 7$ kpa. The breathable film can tightly and completely cover the exhaust port in a bonding or welding manner.

Exemplarily, the material of the movable part and the liquid reagent in the liquid storage container are not subjected to biological and chemical reactions, and the physical property of the movable part is not changed after the movable part is soaked in the liquid reagent for a long time. Another requirement of the material of the movable part is that the density of the material should be smaller than that of the stored liquid reagent. As a feasible solution, the movable part may be made of a high-molecular polymer, such as plastic, in some embodiments, PMMA, PC, PS, PP and the like. Moreover, the volume of the movable part is smaller than the volume of the liquid storage cavity.

In a specific implementation mode, as shown in FIG. 9, the liquid release mechanism 32 includes a thermosensitive viscous structure 323 which is located at the outlet of the liquid storage container 313 and is configured to be bonded with the movable part 314. When the temperature is lower than a set temperature, the sum of the adhesive force of the thermosensitive viscous structure 323 on the movable part 314 and the gravity of the movable part 314 is greater than the buoyancy force on the movable part 314 in the liquid. When the temperature is greater than or equal to the set temperature, the sum of the adhesive force of the thermosensitive viscous structure 323 on the movable part 314 and the gravity of the movable part 314 is smaller than the buoyancy force on the movable part 314 in the liquid.

In some embodiments, the thermosensitive viscous structure 323 has a bonding effect at normal temperature, and the sum of the adhesive force generated by the thermosensitive viscous structure 323 on the movable part 314 and the gravity of the movable part 314 needs to be greater than or equal to the buoyancy force on the movable part 314 in the liquid reagent. The placement positions of the thermosensitive viscous structure 323 at least include a position where the movable part 314 is tangent to the outlet at the lower portion of the liquid storage container 313, so that the thermosensitive viscous structure 323 can be in bonding contact with the movable part 314 conveniently. When the thermosensitive viscous structure 323 is heated, the property of the thermosensitive viscous structure 323 can be changed, and the adhesive force of the thermosensitive viscous structure 323 on the movable part 314 is reduced or disappears, so that the sum of the adhesive force of the thermosensitive viscous structure 323 on the movable part 314 and the gravity of the movable part 314 is smaller than the buoyancy force on the movable part 314 in the liquid reagent, and then the movable part 314 is freed from the bonding constraint of the thermosensitive viscous structure 323 and leaves the opening at the lower portion of the liquid storage container 313 under the buoyancy force action of the liquid reagent, so that the effect of releasing the liquid is achieved.

Exemplarily, the material of the thermosensitive viscous structure includes straight-chain alkanes, branched-chain alkanes or a mixture of the straight-chain alkanes and the branched-chain alkanes. For example, the material may be a hydrocarbon mixture having a carbon atom number of about 18-30.

In a specific implementation mode, as shown in FIG. 9, the liquid release mechanism 32 further includes an electrothermal structure located at the outlet of the liquid storage container 313 and configured to generate heat in response to being electrified so as to heat the thermosensitive viscous structure 323.

Exemplarily, as shown in FIG. 9, the electrothermal structure includes an electrothermal material layer 324 and an electrode layer 325 which are sequentially stacked along a direction of ascending distance from the outlet of the liquid storage container 313. The electrothermal material layer 324 is electrically connected with the electrode layer 325. In some embodiments, the electrothermal structure is provided with a through hole 320 penetrating through all layers of structures of the electrothermal structure, and the through hole faces to the outlet of the liquid storage container 313; in other words, the through hole 320 penetrates through the electrothermal structure and faces to the outlet at the lower portion of the liquid storage container 313 to allow the liquid reagent in the liquid storage container 313 to flow out.

Exemplarily, the material of the electrode layer is conductive metal or metal alloy, including but not limited to Cu, Ag, Au, Al, Al—Nd, Mo—Al—Mo, Mo—Al—Nd—Mo and the like, and the thickness of the electrode layer may be any uniform thickness which can be realized by a conventional processing technology in the art. The electrode layer is discontinuous. In some embodiments, the electrode layer at least includes two independent areas, the two independent areas are connected with the positive pole and the negative pole of the same power supply respectively, and when voltage is applied, no current passes through the two independent areas. In other words, the two independent areas of the electrode layer are respectively used as a positive pole and a negative pole which are electrically connected with the electrothermal material layer.

Exemplarily, the electrothermal material layer is a material layer with an electrothermal effect and includes but not limited to indium tin oxide, nickel-chromium alloy, iron-chromium-aluminum alloy, barium titanate ceramic, silicon carbide, lanthanum chromate, zirconium oxide, molybdenum disilicide and the like, and the thickness of the electrothermal material layer may be any thickness which can be realized by a conventional processing technology in the art. The electrothermal material layer is located on the side of the electrode layer facing the liquid storage container, the projection on horizontal plane of the electrothermal material layer needs to cover the two independent areas (the positive pole and the negative pole) of the electrode layer, and the electrothermal material layer is electrically connected with the two independent areas of the electrode layer. In some embodiments, when voltage is applied to two independent areas (the positive pole and the negative pole) of the electrode layer, the two independent areas are connected through the electrothermal material layer, so that current passes through the connected two independent areas, the electrothermal material layer is heated by the electrothermal effect, and heat is conducted to the thermosensitive viscous structure.

Exemplarily, the electrode layer and the electrothermal material layer may be prepared by means of sputtering, deposition and the like, and may also be realized by other conventional processing means known to those skilled in the art.

In a specific implementation mode, as shown in FIG. 9, the electrothermal structure may further include one or more of an insulating layer 327, a protective layer 328, a substrate layer 326 and a heat insulation layer (not shown in the figure).

Exemplarily, the substrate layer 326 is located on the side of the electrode layer 325 facing away from the electrothermal material layer 324, and is configured to bear film layers. The material of the substrate layer 326 should be easy to process and can be punched, deposition or sputtering of a specific material can be carried out on the surface of the substrate layer 326, the substrate layer 326 may be one of glass, plastic and metal meeting requirements. In some embodiments, the material of the substrate layer 326 is glass, and the thickness range of the substrate layer 326 may be 0.1 mm-5 mm, for example 0.5 mm.

Exemplarily, the insulating layer 327 is located between the electrothermal material layer 324 and the electrode layer 325, and is provided with a via hole allowing the electrothermal material layer 324 to be electrically connected with the electrode layer 325. In some embodiments, the material of the insulating layer 327 is a non-metallic substance with an insulating property, including but not limited to $SiO_2$, $Si_3N_4$, PI, PTFE, PVDF, PDMS and the like, and the thickness of the insulating layer 327 can be any thickness which can be realized by a conventional processing technology in the art. The insulating layer 327 at least covers part of the electrode layer 325, and independent holes are formed in the corresponding positions of the two independent areas of the electrode layer 325 respectively. The electrothermal material layer 324 and the two independent areas of the electrode layer 325 are connected through the holes of the insulating layer 327. It should be noted that in embodiments in some cases, there may also be no insulating layer 327 between the electrode layer 325 and the electrothermal material layer 324.

Exemplarily, the protective layer 328 is located on the side of the electrothermal material layer 324 facing away from the electrode layer 325, and is configured to protect the electrothermal material layer 324. The material of the protective layer 328 is a non-metallic substance with an insulating property, the material of the protective layer 328 includes but is not limited to $SiO_2$, $Si_3N_4$ and the like, the protective layer 328 can cover the surface of the electrothermal material layer 324 in a thin film deposition manner, and the thickness of the protective layer 328 may be any thickness, such as $10^{-4}$ microns to 1 microns, which can be realized by a conventional processing technology in the art. Generally, the thickness of the protective layer 328 may be in the order of magnitude of $10^{-2}$ microns to $10^{-3}$ microns. The protective layer 328 may be provided with a hole, the electrode layer 325 can be directly exposed at the hole for being in contact with an external power supply, or a connecting lead is led out from the hole to connect the electrode layer 325 to the external power supply.

Exemplarily, the heat insulation layer is located on the side of the substrate layer 326 facing away from the electrode layer 325 and is used for preventing heat of the electrothermal structure from being conducted to the side of the chip body. On one hand, the heat of the electrothermal structure can be conducted to the thermosensitive viscous structure 323 on one side of the liquid storage container 313 as much as possible, and on the other hand, the influence of heat generated by the electrothermal structure on the functions of structural parts in the chip body can be avoided.

In a specific implementation mode, as shown in FIG. 9, the electrothermal structure includes a substrate layer 326, an electrode layer 325, an insulating layer 327, an electrothermal material layer 324 and a protective layer 328 from bottom to top from the substrate layer 326. In addition, a heat insulation layer located on one side of the lower surface of the substrate layer 326 may be further included.

In some embodiments, the electrothermal structure is provided with a through hole 320 penetrating through all layers of structures. That is, the layers of structures in the electrothermal structure are each provided with a through hole, and the center positions of the through holes of the layers of structures are consistent. Exemplarily, the shape of the through hole of each layer of structure may be arbitrary, such as a circle.

In a specific implementation mode, as shown in FIG. 9, the movable part 314 is spherical; the thermosensitive viscous structure 323 is located between the electrothermal structure and the outlet of the liquid storage container 313 and is tangent to the surface of the movable part 314. In other words, the thermosensitive viscous structure 323 is located between the through hole 320 of the electrothermal structure and the outlet of the liquid storage container 313. On one hand, the thermosensitive viscous structure 323 can be in bonding contact with the movable part 314, and on the other hand, the thermosensitive viscous structure 323 can receive heat transferred by the electrothermal structure. As such, the viscosity of the thermosensitive viscous structure 323 is changed until the thermosensitive viscous structure 323 is not viscous enough to stick the movable part 314, and the movable part 314 is disengaged.

Exemplarily, in the through holes of all layers of structures of the electrothermal structure, the size of the through hole of the electrothermal material layer may be slightly smaller than the sizes of the through holes of other layers. Namely, the projections on horizontal plane of the other layers are all located in the range of the electrothermal material layer. Therefore, heat generated by the electrothermal material layer can be uniformly distributed around the through hole and can be quickly transferred to the thermosensitive viscous structure at the through hole.

Exemplarily, the liquid release mechanism may further include a protective cover. The protective cover is located between the electrothermal structure and the liquid storage container. The material of the protective cover may be the same as that of the substrate layer of the electrothermal structure. The protective cover is attached to the upper portion of the electrothermal structure and in contact with the protective layer. The protective cover is provided with an opening which is the same as the center position of the through hole of the electrothermal structure. Projections on horizontal plane of the opening and the through hole have similar figures, and the size of the opening is slightly greater than that of the through hole. The movable part may be tangent to the side of the opening of the protective cover away from the electrothermal structure. According to the implementation, the movable part, the position where the movable part is tangent to the through hole and the position where the movable part is tangent to the opening in the protective cover can define an independent area, and the area can be filled with the thermosensitive viscous structure. Therefore, the temperature response of the thermosensitive viscous structure excited by the electrothermal effect generated by the electrothermal material layer is more sensitive.

In some embodiments, FIG. 1 shows a structural schematic diagram of the liquid storage container 3 connected to the chip body 10 according to the embodiment of the application, as shown in FIG. 1 and FIG. 9, in the liquid storage container 3 according to the embodiment of the application, the liquid release mechanism 32 has two functions, one function is to be connected with the liquid storage mechanism 31 for fixing, and realize the sealing of a liquid reagent contained in the liquid storage container 313 through cooperation with the movable part 314; and the other function is to control opening of a liquid reagent release port (the opening at the lower portion of the liquid storage container 313), so that liquid flows into the liquid inlet channel 21 of the chip body 10. In some embodiments, the liquid release mechanism 32 and the liquid storage mechanism 31 can be fixed and packaged through conventional processes such as bonding and welding which are well known to those skilled in the art, so as to form a complete structure.

According to the embodiment of the application, the switching structure (movable part) for controlling the release of the reagent is arranged in the liquid storage container, and the control of the switching structure and the release of the liquid reagent are realized by heat energy change. Electric energy required for generating heat energy can be uniformly provided by a power supply required for driving chip equipment to work, thus a mechanical ejector rod, a heating film, a centrifugal driver and other devices used in an existing reagent release solution can be omitted. The cost and size of in-vitro diagnostic equipment can be remarkably reduced, and the characteristics of being simple in release mode, sensitive and rapid in response and easy to integrate are realized. According to the in-vitro diagnosis microfluidic chip integrated with the structure, all required reagents do not need to be manually added in various stages of the detection process, and integrated one-stop detection of 'sample in-result out' of physiological and pathological indexes is expected to be realized.

Figure 10:
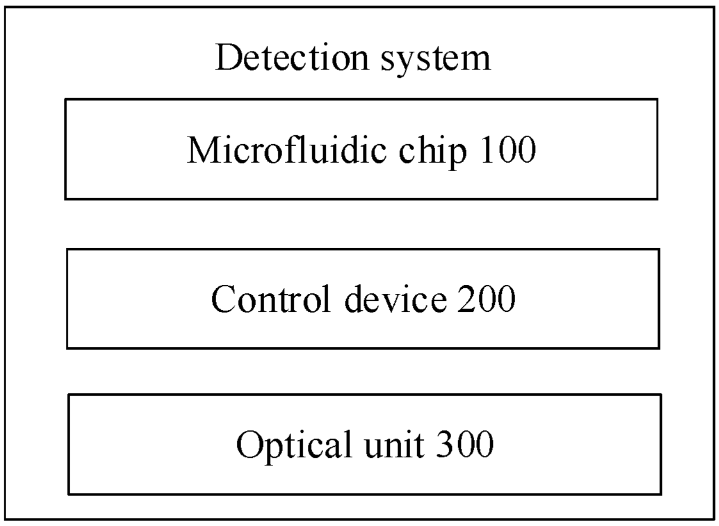
FIG. 10 is a structural block diagram of a detection system according to an embodiment of the application.

In addition, as shown in FIG. 10, the application also provides a detection system, and the detection system includes the microfluidic chips 100 according to any one of the above embodiments.

In some embodiments, as shown in FIG. 10, the detection system further includes a control device 200, and the control device 200 is electrically connected with the microfluidic chip 100 and is configured to apply an electric signal to the microfluidic chip 100 so as to drive the microfluidic chip 100 to work.

In some embodiments, as shown in FIG. 10, the detection system may further include an optical unit 300 configured to perform optical detection on the microfluidic chip 100.

Exemplarily, the optical unit may include a fluorescence detection device, for example, the fluorescence detection device may include a fluorescence light source and an image sensor (e.g., a charge-coupled device (CCD) image sensor). Exemplarily, the optical unit may also include an image processing device configured to process a detection picture output by the fluorescence detection device. For example, the image processing device may include a central processing unit (CPU) or a graphics processing unit (GPU) or the like. For example, the control device is further configured to control the fluorescence detection device and the image processing device to perform corresponding functions.

It should be noted that in some embodiments of the disclosure, the microfluidic chip and the detection system may further include other functional structures which can be determined according to actual requirements, and the embodiments of the disclosure do not limit the functional structures. Besides, in the microfluidic chip according to the embodiment of the application, the description of the shape and size of a structure of each part is only an exemplary example of some embodiments, and the shape and size of the structure of each part are not limited to the embodiments during actual design, which will not be repeated herein. Further, the figures in the application are only schematic diagrams, and the specific size and proportion of the structure of each part in the figures do not represent the actual size and proportion of each structure.

Obviously, those skilled in the art can make various modifications and variations on the embodiment of the application without departing from the spirit and range of the application. Thus, if these modifications and variations made to the present application fall within the scope of the claims of the present application and equivalent technologies thereof, the present application is also intended to include these modifications and variations.

What is claimed is:

1. A microfluidic chip, comprising a fluid inlet channel and a microvalve, the microvalve comprising a magnetic valve core, a valve core movement channel and a magnetic control device;

wherein the valve core movement channel is provided with at least two adapter openings, and at least one of the at least two adapter openings is connected to the fluid inlet channel;

the magnetic valve core is located in the valve core movement channel and is movable in the valve core movement channel, and a radial size of the magnetic valve core is greater than a radial size of each adapter opening;

the magnetic control device is located outside the valve core movement channel, and is configured to move along the valve core movement channel to drive the magnetic valve core to move in the valve core movement channel;

wherein the microvalve further comprises a positioning magnetic body, and the positioning magnetic body is located at each adapter opening and is configured to position the magnetic valve core between each adapter opening through a magnetic force when the magnetic valve core reaches each adapter opening;

the positioning magnetic body further configured to be arranged independently from the chip body and detachably installed on the surface of the chip body, or configured to be fixed to the edge of the adapter opening of the valve core movement channel.

2. The microfluidic chip according to claim 1, wherein the magnetic valve core is spherical; a section of the valve core movement channel is circular, and a section size of the valve core movement channel is matched with a section size of the magnetic valve core.

3. The microfluidic chip according to claim 2, wherein the valve core movement channel comprises one or more branches, and an end portion of each branch is provided with one adapter opening.

4. The microfluidic chip according to claim 3, wherein a radial size of the end portion of each branch is greater than radial sizes of other positions of the valve core movement channel.

5. The microfluidic chip according to claim 3, wherein a side wall of the valve core movement channel is provided with an accommodation part protruding outward, and the accommodation part is configured to accommodate the magnetic valve core.

6. The microfluidic chip according to claim 1, wherein the magnetic control device comprises:

a driving magnetic body, configured to drive the magnetic valve core to move in the valve core movement channel by a magnetic force; and a mechanical arm, connected to the driving magnetic body and configured to drive the driving magnetic body to move along the valve core movement channel.

7. The microfluidic chip according to claim 1, wherein the microfluidic chip further comprises a liquid supply device, wherein the liquid supply device comprises a liquid storage mechanism and a liquid release mechanism;

the liquid storage mechanism is configured to store liquid;

and the liquid release mechanism is configured to be connected with the liquid storage mechanism and the fluid inlet channel and release the liquid in the liquid storage mechanism into the fluid inlet channel in response to being triggered.

8. The microfluidic chip according to claim 7, wherein the liquid storage mechanism is provided with a liquid storage container and a sealing layer for sealing an outlet at a lower portion of the liquid storage container; the liquid storage container is made of a tough material which is deformable under stress;

the liquid release mechanism comprises an accommodation cavity connected with the fluid inlet channel, wherein an opening of the accommodation cavity faces to the sealing layer, and an edge of the sealing layer is hermetically connected with an edge of the opening of the accommodation cavity;

the edge of the opening of the accommodation cavity is provided with a protruding part extending towards a center of the opening of the accommodation cavity, an orthographic projection of the protruding part on the sealing layer is located within a non-hermetical-connection area of the sealing layer, and the protruding part is configured to pierce the sealing layer when an interaction between the protruding part and the sealing layer occurs.

9. The microfluidic chip according to claim 8, wherein a material of the sealing layer comprises aluminum foil; and a material of the liquid storage container comprises plastic.

10. The microfluidic chip according to claim 8, wherein the microfluidic chip comprises a chip body; wherein the chip body is provided with the accommodation cavity and the fluid inlet channel; and the liquid storage mechanism is fixed to the chip body.

11. The microfluidic chip according to claim 10, wherein the liquid supply device further comprises a connecting layer, and the connecting layer is disposed between the sealing layer of the liquid storage mechanism and the accommodation cavity of the liquid release mechanism and is configured to hermetically connect the sealing layer with the edge of the opening of the accommodation cavity.

12. The microfluidic chip according to claim 11, wherein the connecting layer is provided with a hollow part; an orthographic projection of an extending end of the protruding part on the sealing layer is located in an orthographic projection of the hollow part on the sealing layer.

13. The microfluidic chip according to claim 7, wherein the liquid storage mechanism comprises a liquid storage container and a movable part located in the liquid storage container; wherein a size of the movable part is greater than a size of an outlet at a lower portion of the liquid storage container; and the movable part is configured to seal the outlet of the liquid storage container; gravity of the movable part is smaller than a buoyancy force of liquid in the liquid storage container on the movable part;

the liquid release mechanism is located at the outlet of the liquid storage container, and is configured to: absorb the movable part to enable the movable part to seal the outlet of the liquid storage container, or release an adsorption force on the movable part to enable the movable part to leave the outlet of the liquid storage container under an action of the buoyancy force.

14. The microfluidic chip according to claim 13, wherein an exhaust port is provided at a top of the liquid storage container, and the liquid storage mechanism further comprises a breathable film for sealing the exhaust port at the top of the liquid storage container; or, the liquid storage container is made of a tough material which is deformable under stress.

15. The microfluidic chip according to claim 13, wherein the liquid release mechanism comprises:

a thermosensitive viscous structure, located at the outlet of the liquid storage container and configured to be bonded with the movable part, wherein when the temperature is lower than a set temperature, a sum of an adhesive force of the thermosensitive viscous structure on the movable part and the gravity of the movable part is greater than the buoyancy force on the movable part in the liquid; and when the temperature is higher than or equal to the set temperature, the sum of the adhesive force of the thermosensitive viscous structure on the movable part and the gravity of the movable part is smaller than the buoyancy force on the movable part in the liquid.

16. The microfluidic chip according to claim 15, wherein the liquid release mechanism further comprises an electrothermal structure, located at the outlet of the liquid storage container and configured to generate heat in response to being electrified to heat the thermosensitive viscous structure.

17. The microfluidic chip according to claim 16, wherein the electrothermal structure comprises an electrothermal material layer and an electrode layer which are sequentially stacked in a direction of ascending distance from the outlet of the liquid storage container; wherein the electrothermal material layer is electrically connected with the electrode layer; and the electrothermal structure is provided with a through hole penetrating through all layers of the electrothermal structure, and the through hole faces to the outlet of the liquid storage container.

18. The microfluidic chip according to claim 17, wherein the electrothermal structure further comprises one or more of an insulating layer, a protective layer, a substrate layer and a heat insulation layer; wherein the insulating layer is disposed between the electrothermal material layer and the electrode layer, and is provided with a via hole allowing the electrothermal material layer to be electrically connected with the electrode layer;

the protective layer is disposed on a side of the electrothermal material layer facing away from the electrode layer, and is configured to protect the electrothermal material layer;

the substrate layer is disposed on a side of the electrode layer facing away from the electrothermal material layer and is configured to bear film layers;

the heat insulation layer is disposed on a side of the substrate layer facing away from the electrode layer; or the movable part is spherical; and the thermosensitive viscous structure is located between the electrothermal structure and the outlet of the liquid storage container and is tangent to a surface of the movable part.

19. A detection system, comprising the microfluidic chip according to claim 1.

* * * * *